US006183169B1

(12) United States Patent

Zhu et al.

(10) Patent No.: US 6,183,169 B1
(45) Date of Patent: Feb. 6, 2001

(54) PRECISION DISPENSING OF ULTRA-FINES VIA A GAS MEDIUM

(75) Inventors: Jingxu Zhu, London; John R. Grace, Vancouver, both of (CA); Nazaneen Pourkavoos, Morristown, NJ (US)

(73) Assignee: The University of Western Ontario, London (CA)

( * ) Notice: Under 35 U.S.C. 154(b), the term of this patent shall be extended for 0 days.

(21) Appl. No.: 09/133,216

(22) Filed: Aug. 13, 1998

(51) Int. Cl.[7] ...................................................... B65G 53/40

(52) U.S. Cl. ............................ 406/123; 406/52; 406/75; 406/86; 406/92; 406/135; 406/176; 222/637

(58) Field of Search .............................. 222/637; 406/46, 406/52, 75, 86, 92, 176, 180, 93, 123, 134, 135

(56) References Cited

U.S. PATENT DOCUMENTS 2,715,551 * 8/1955 Kiernan ................................ 302/55
4,367,685 * 1/1983 Frame et al. .......................... 406/93
4,545,704 * 10/1985 Heinemann ......................... 406/123
4,824,295 * 4/1989 Sharpless ............................ 406/123

* cited by examiner

*Primary Examiner*—Christopher P. Ellis
*Assistant Examiner*—Joe Dillon, Jr.
(74) *Attorney, Agent, or Firm*—R. Craig Armstrong

(57) ABSTRACT

A dispensing apparatus for the dispensing of ultra-fine particles on a dry basis in a reproducible manner. The apparatus includes a first gas-solids suspension chamber having particle fluidization means adapted thereto, and a conduit adapted between the first gas-solids chamber and a second gas-solids chamber for communicating via at least one particle orifice particles between the chambers. A high velocity gas stream provides a pressure difference between the chambers whereby a low pressure zone is created within the conduit thereby drawing in particles from the first gas-solids suspension chamber into the second gas-solids suspension chamber via the conduit. The apparatus further includes a combination of a withdrawal feed and a solenoid valve to direct particles from the second gas-solids suspension chamber into a collection area.

13 Claims, 5 Drawing Sheets

PRECISION DISPENSING OF ULTRA-FINES VIA A GAS MEDIUM

BACKGROUND OF THE INVENTION

1. Field of the Invention

This invention relates to the accurate dispensing of very small quantities of ultra-fine particles in a reproducible manner.

2. Description of the Prior Art

In the pharmaceutical industries (and also other industries), it is often necessary to accurately dispense very small quantities (order of 1 mg or less) of ultra-fine (<10 mm) pharmaceutical (and other) particles on a dry basis in a reproducible manner. For example, very fine particles are administered to patients by means of inhalation. Higher potency of these new drug compounds requires much smaller doses than in previous dispensing applications. The existing equipment available commercially can only dispense an amount of the order of 5±0.5 mg. It would be desirable to be able to dispense quantities of 1 mg or less with a spread of ±0.1 mg or less.

There is no available technology to dispense such small quantities of ultra-fine particles on a dry basis. For quantities larger than 5 mg, several types of solids feeding systems have been developed over the years. Among them are feeders designed to deliver particles at flowrates of the order of 1 kg/h for laboratory and pilot scale gas-solid reactions (e.g. combustion, gasification, catalytic reactions and metallurgical processes). The most common kind of solids feeder is the mechanical feeder such as a belt or screw conveyor. However, mechanical feeders are generally inefficient and unreliable in feeding very fine particles due to the cohesive properties of the powder which prevent free-motion of solids and lead to difficulty in transporting the powder.

A fluidized bed feeder as a non-mechanical solids feeder would have the potential to dispense smaller quantities with suitable reproducibility. While there are several types of conventional fluidized bed feeders developed, none of them is suitable for the required small quantities and ultra-fine particles. None of the reported feeders can dispense the very small quantity of fine particles of interest here.

Processing of fine particles (including nanometer particles) have been identified by governments and industries as one of the key development areas for the 21st century.

To accurately dispense ultra-fine particles, all mechanical methods would fail due to the cohesive nature of the ultra-fine particles. The existing conventional solids feeders cannot handle the small quantities of particles for drug doses of the order of 1 mg or less.

SUMMARY OF THE INVENTION

It is an object of the invention to accurately dispense very small quantities of ultra-fine particles, such as pharmaceuticals, on a dry basis in a reproducible manner.

In the invention, there is provided a two-stage fluidization via the use of a pressure difference between the two stages.

According to the invention there is provided an apparatus for dispensing particles on a dry basis comprising: a first gas-solids suspension chamber having particle fluidization means adapted thereto; at least one conduit adapted to said first gas-solids chamber and a second gas-solids chamber for communicating via at least one particle opening adapted thereto particles between said chambers; means for providing a pressure difference between said first gas-solids suspension chamber and said second gas-solids suspension chamber, whereby said pressure difference means creates a low pressure zone within said at least one conduit thereby drawing in particles from said first gas-solids suspension chamber into said at least one conduit; and, means for withdrawing particles from said second diluted gas-solids suspension chamber into a collection area.

One application of this new fluidized dispensing system is in the pharmaceutical industry to dispense very small doses for drug administration. This technology can also find applications in many other industries when the metering of small quantities of particles is required.

One advantage of this invention is that accurate dispensing of small quantities of fine particles using cost-effective pneumatic rather than mechanical means is achieved.

Although the invention is well suited for ultra-fine particles and for small quantities, the invention can handle larger particles and quantities of larger than 1 mg, up to the point where other more conventional methods begin to work more effectively—for example in the 100–200 mg range. However, the smaller the particles the more difficult it is to dispense them using conventional methods. The application of the invention is, therefore, not to be construed as one that is strictly limited to only dispense very small quantities of the order of 1 mg or less, and ultra-fine particles.

Further features of the invention will be described or will become apparent in the course of the following detailed description.

BRIEF DESCRIPTION OF THE DRAWINGS

In order that the invention may be more clearly understood, preferred embodiments thereof will now be described in detail by way of example, with reference to the accompanying drawings, in which.

DETAILED DESCRIPTION OF THE PREFERRED EMBODIMENT

Figure 1:
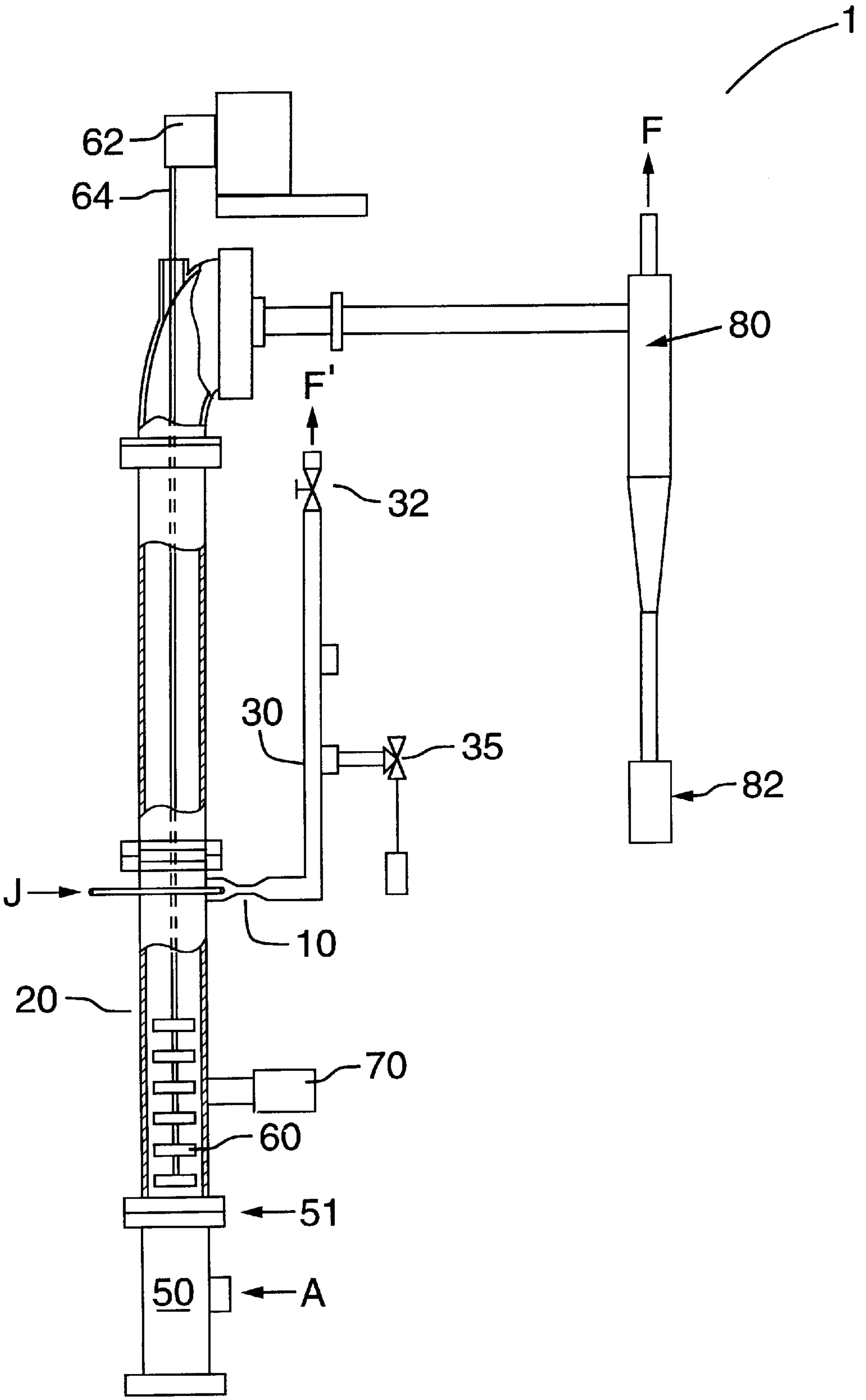
FIG. 1 is a schematic overview of the dispensing system.
Figure 3:
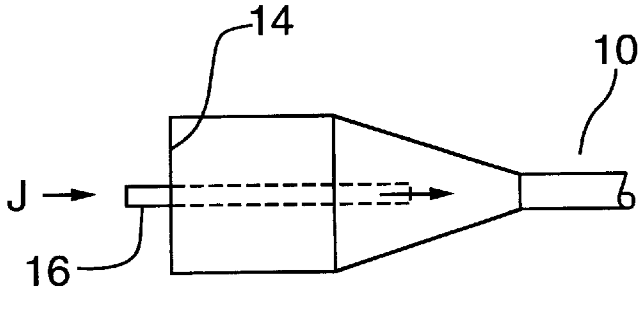
FIG. 3 is a partial view of the first embodiment of the Venturi tube.
Figure 4:
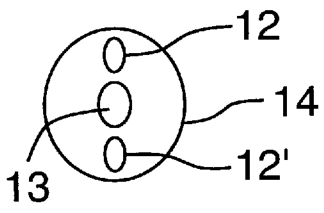
FIG. 4 is a front view of the Venturi tube plate.

With reference to FIGS. 1–5, there are shown embodiments of the invention to improve the reproducibility of the metering. In more specific terms, there is shown a two-stage fluidized bed system with, preferably, a Venturi tube for fine particle withdrawal. The overall system layout is shown in FIG. 1 and the details of the Venturi tube 10 are given in FIG. 2. Although the description that follows is with respect specifically to a Venturi tube and a high velocity gas stream therein, it is to be understood that any form of conduit in which a pressure difference between the first suspension chamber and the second suspension chamber is provided so as to result in a decreased fluid pressure in the second chamber would be suitable in this invention. For example, a vacuum (not shown) in lieu of the high velocity gas stream may be disposed in the general area at the upper end of the second suspension chamber 30 to provide a lower pressure in the conduit. Alternatively, the first suspension chamber may be pressurized to a pressure greater than the second suspension chamber. In the case of the Venturi tube, the combined effect of the constriction at the neck of the Venturi and the high velocity gas stream results in an increased fluid velocity and a decreased fluid pressure at the constriction. In essence the constricted conduit creates a vacuum at the exit side thereof. Examples of alternative conduits are presented in FIGS. 2*a*–2*d* and 3*a*. In each instance, a high velocity gas stream, generally designated J, is shown, but as aforementioned this need not be the case in every circumstance.

In a preferred embodiment of the invention, the system includes a fluidized bed 20, a dilute phase suspension column 30, and a Venturi tube 10 to feed particles from the freeboard 41 of the dense fluidized bed 40 into the dilute phase suspension column 30. Although columns are shown, a variety of different suspension chambers would work just as effectively. The airflow through the Venturi tube provides suction which draws particles through small orifices 12, 12' on the entrance side of the tube from the freeboard of the dense bed into the dilute suspension column so that a steady dilute flow of particles can be maintained.

Figure 2:
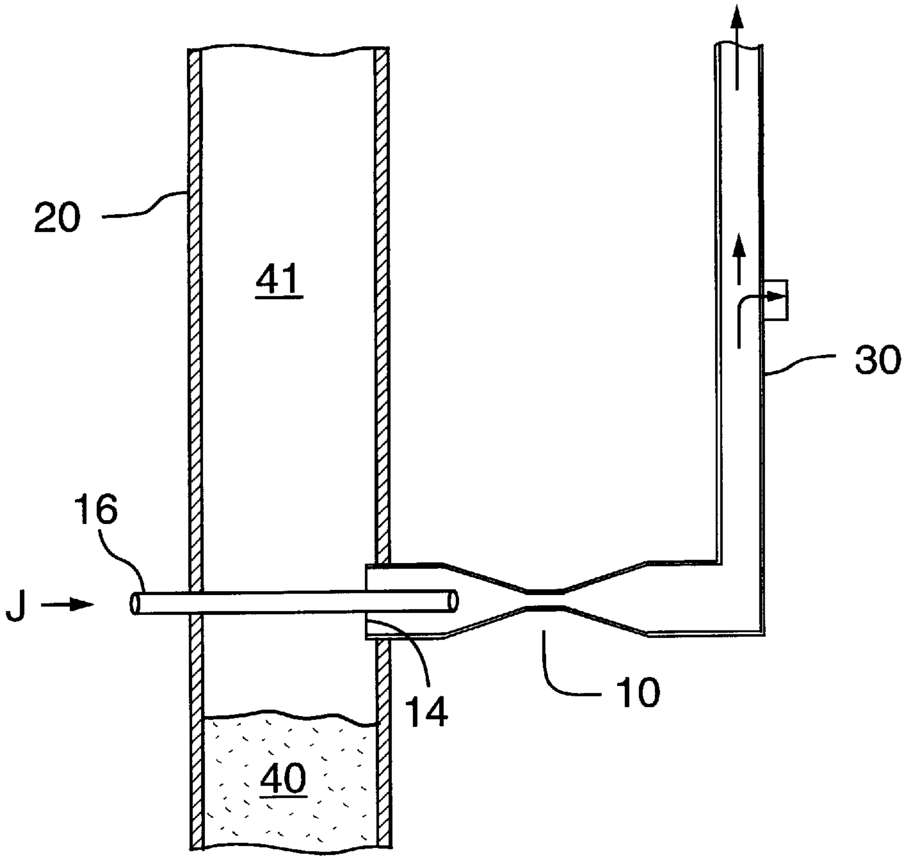
FIG. 2 is a close-up view of the first embodiment of the Venturi tube area of the dispensing system shown in section.
Figure 2A:
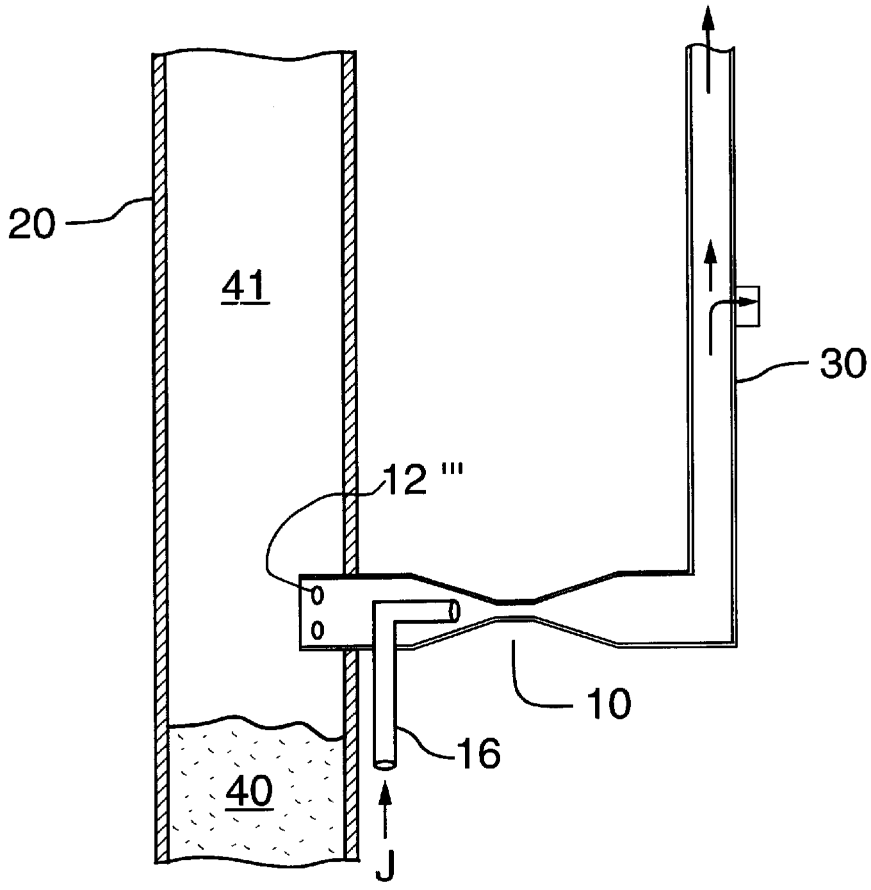
FIGS. 2*a* to 2*d* and 3*a* are alternative embodiments of the conduit and high velocity gas stream configuration.
Figure 3A:
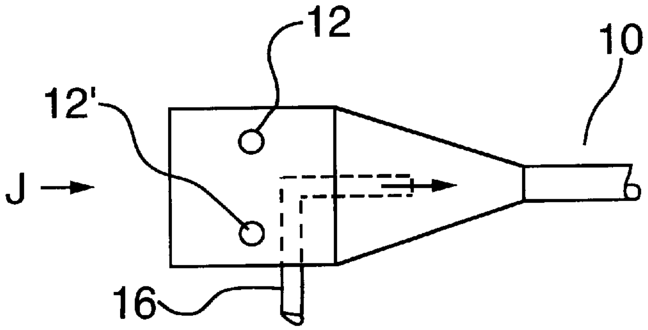
Figure 2B:
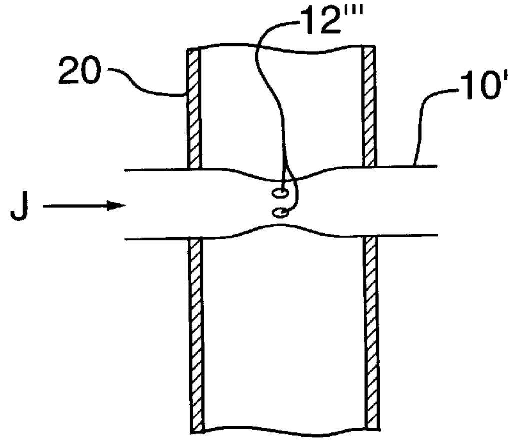
Figure 2C:
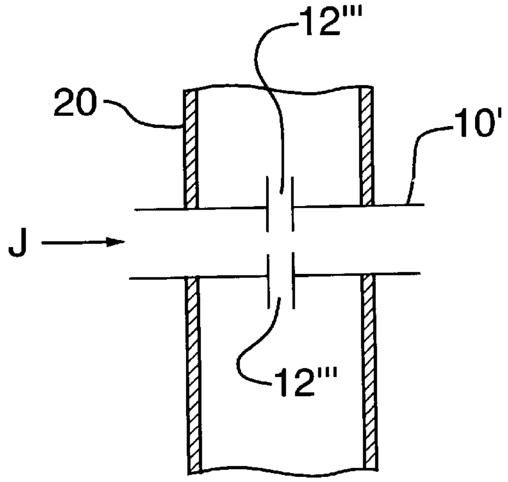
Figure 2D:
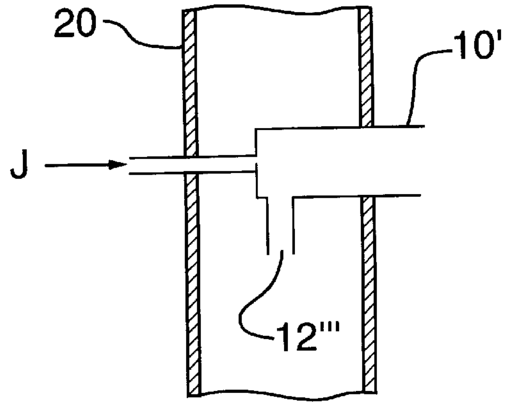

In a preferred embodiment, the fluidization system comprises a fluidized bed column 20 of 76 mm I.D. and 0.91 m height, a Venturi tube 10 and a dilute phase suspension column 30 of 32 mm I.D. and 0.36 m height. A variety of other dimensions will work as well. The main parts of the fluidized bed column and the dilute suspension column are made of plexiglass to permit visual observation of the fluidization behavior, but other materials work just as well. A high efficiency cyclone 80 is preferably installed at the exit of the fluidized bed to separate particles carried out by the gas stream. In another embodiment of the invention, a cyclone or any suitable form of particle filtering system could be placed within the freeboard. In this latter variation, a reduction of size of the system is achieved. The particles captured by the cyclone are collected in a container 82. Alternatively (not shown), the captured particles may be returned to the bottom of the fluidized bed. In a preferred embodiment, the Venturi is positioned at a high location in the freeboard, with its axis 0.38 m above the bottom air distributor 51. It is to be understood that a variety of positions may be suitable for the Venturi so long as the entrance side will come into contact with diluted particles from the freeboard of the dense particle bed in the fluidization bed. When larger quantities are metered, it would be necessary to have the Venturi entrance in the dense bed to increase the flow rate (not shown). In the preferred embodiment, the Venturi tube is 130 mm in length and 19 mm in diameter with its neck section 19 mm long and 9.5 mm in diameter. Other dimensions will work effectively. In a first embodiment of the invention, a plate 14 positioned essentially vertically at the entrance side of the Venturi is utilized. In addition to the opening 13 for the high velocity gas feed tube, two orifices 12, 12' were drilled into the plate. The plate acts to control the mass flow rate of particles diverted to do the feeding. In another embodiment of the invention, as shown in FIG. 2*a,* orifices are not at the entrance side wall, instead orifices are drilled into a wall of the Venturi at the closed ended side. The first embodiment is advantageous in that a variety of orifice numbers and sizes may be used without changing the Venturi apparatus. Preferably, the diameter of the holes 12, 12' are about 1–5 mm. Alternative embodiments of the constricted conduits are shown in FIGS. 2*a*–2*d*. For instance, FIG. 2*b* illustrates a setup in which high velocity gas going through the Venturi neck creates a vacuum. Particles are drawn into the neck through a series of several small holes on the neck. FIG. 2*c* shows another setup in which particles are drawn into the gas stream from the two side tubes by the low pressure created by the high velocity gas flow in the horizontal direction. FIG. 2*d* shows yet another setup in which particles are drawn into the gas stream from the side tube by the low pressure created by the high velocity gas flow in the horizontal direction.

The dilute gas-particle suspension flow from the suspension column is not returned to the main fluidization column, to ensure that there is enough pressure drop between the inside of the Venturi tube and the freeboard of the dense fluidized bed and thereby to provide smooth flow of particles from the main fluidized bed column into the Venturi tube. Instead, the gas-particle suspension is passed through a filter (not shown) to catch the fine powder while the air is released to the atmosphere. This flow of the gas-particle suspension is illustrated by the arrow marked F'. In a commercial setup, the separated particles would likely be returned to the first fluidization column. Preferably, a butterfly valve 32 is installed at the exit of the suspension column. This valve is normally open during the operation of the system, but could be closed periodically and with a source of air introduced into the column to force the air to flow back into the dense bed so as to purge the Venturi. This action prevents the orifices of the Venturi tube from becoming blocked by the fine particles.

Air, monitored by rotameters, is used to fluidize the particles in the main fluidized bed column and to entrain the particles in the dilute suspension column. It should be noted that a variety of other gases besides air will work as well. The air, marked A, enters a windbox 50 and exits into the system via an air distributor 51 clamped between two flanges as shown in FIG. 1. To control the moisture level of the air, the two streams (A and J) may be, preferably, first passed through two separate packed bed adsorption tubes containing a desiccant such as silica gel. A perforated plate (not shown), 3 mm thick with a plurality of evenly spaced 2.4 mm diameter holes, providing a total open area of 5%, was used as the gas distributor in the dense bed. A metal sieve (not shown) of 10 $\mu$m pore size covers the distributor to prevent blockages of the holes. Preferably, six impellers 60 mounted onto a shaft 64 is positioned within the fluidization bed to stir the dense phase in order to improve the fluidization quality of the very fine particles. The shaft is driven by a mechanical stirrer 62. A vibrator 70 of variable frequency such as a pneumatic turbine is mounted on the outer wall of the main column to aid in fluidizing the fine cohesive particles. The Venturi feeding mechanism was found to be very effective for providing a uniform dilute phase suspension. High velocity air flow, having a velocity in the order of 10–50 m/s, inside the Venturi tube causes a reduced pressure inside the neck of the Venturi tube, so that particles are drawn in from the dilute freeboard region of the fluidized bed and into the Venturi tube. These particles are then carried from the Venturi tube into the dilute suspension column, forming a more dilute and very stable gas-solids suspension. Hence, the Venturi tube acts as an intermediate controlled conduit between a first gas-solids suspension volume and a more dilute second gas-solids suspension volume.

Small quantities of ultra-fine lactose (or other ultra-fine) powder are then withdrawn from the dilute suspension column where a uniform suspension of the powder is maintained. The withdrawal port is a 6.3 mm (¼") port drilled on the side wall. When this is open, a small quantity of powder suspension will flow out of the column given the positive pressure inside the dilute suspension column. By adjusting the opening period of the withdrawal port, the amount of powder withdrawn can be accurately controlled. When multiple withdrawal ports are drilled, the productivity is increased significantly.

Figure 5:
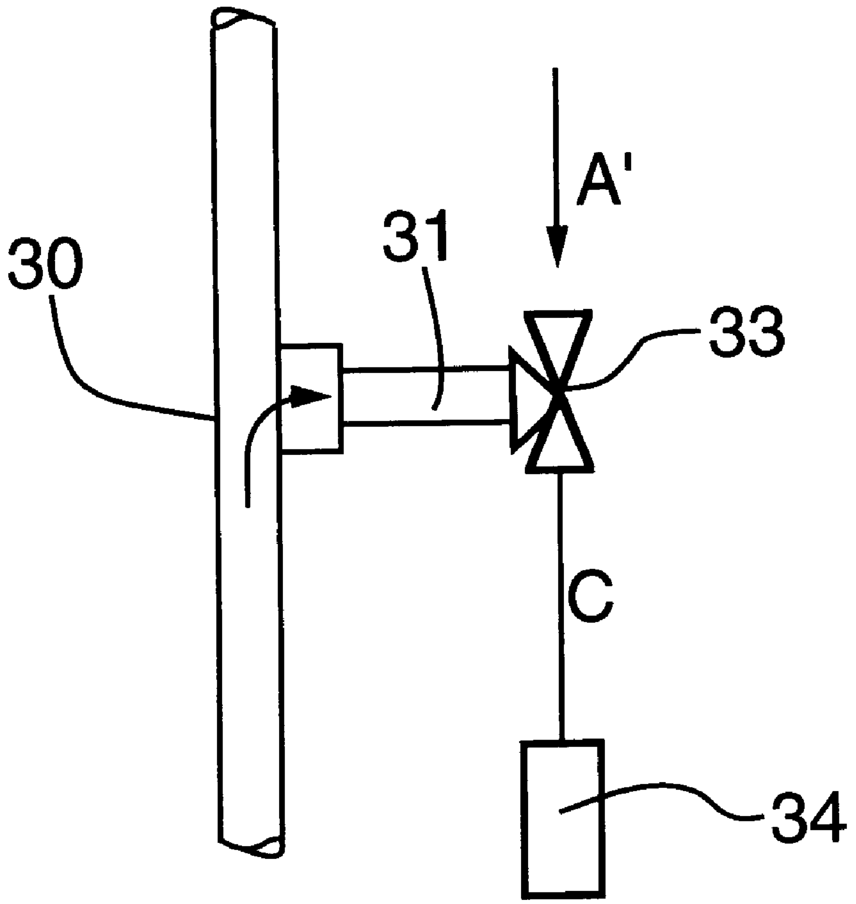
FIG. 5 is a schematic close-up view of the dilute particle withdrawal configuration.

A schematic of the preferred particle withdrawal system is shown in FIG. 5. The withdrawal of particles is controlled by a three-way solenoid valve 33 and a timer (not shown). Lines A' and B are initially open while line C is closed by switching the solenoid valve to the off position, so that back-purging gas from line A' flows into the dilute suspension column, preventing the particles from entering the withdrawal tube 31. At the start of the withdrawing sequence, line C is opened and line A' is closed by switching the three-way solenoid valve 33 on. As soon as the flow of purging gas is stopped, the gas-solids suspension begins to flow out of the dilute bed 30 into the withdrawal tube 31 and eventually into the collection cell 34. This flow is caused by the small pressure difference between the dilute suspension column and the outside, and can be enhanced by applying a suction pressure (vacuum) at the end of the withdrawal train. A predetermined amount of particles is dispensed by controlling the amount of time the solenoid is open.

An alternative withdrawal apparatus (not shown) would be a two-way solenoid valve installed in a single tube line connecting the dilute phase column and the collection cell. The solenoid valve would be closed when there is no withdrawal and open during the withdrawal process. Purging would become unnecessary when the withdrawal frequency is very high.

Experimental results show that, with appropriate operating conditions it is possible to achieve good quality fluidization for the lactose powder with the aid of internal stirring and/or external vibration and/or other fluidization aids and to achieve good reproducibility of the lactose withdrawal quantities from the dilute suspension column connected to the main fluidized bed through the Venturi off-take.

It will be appreciated that the above description relates to the preferred embodiment by way of example only. Many variations on the invention will be obvious to those knowledgeable in the field, and such obvious variations are within the scope of the invention as described and claimed, whether or not expressly described.

What is claimed as the invention is:

1. Apparatus which dispenses dry particles, comprising:

a first-stage gas-solids fluidization chamber and at least one second-stage gas-solids fluidization chamber, each first-stage said first-stage and said at least one and second-stage chamber having particle fluidization means for creating a suspension of said particles within said chambers;

for each said second-stage chamber, a conduit connected for suspended particles to flow from said first-stage chamber to said second-stage chamber for suspension in said second-stage chamber;

means for providing a pressure drop from said first-stage chamber to each said second-stage chamber, to produce said flow of suspended particles from said first-stage chamber to said second-stage chamber; and, for each said second-stage chamber, means for withdrawing suspended particles from said at least one second-stage chamber into at least one collection area.

2. Apparatus as recited in claim 1, wherein said means for providing a pressure drop from said first-stage chamber to each said second-stage chamber is a Venturi in each said conduit, supplied with a high velocity gas to create a Venturi effect.

3. Apparatus as recited in claim 1, wherein said means for providing a pressure drop from said first-stage chamber to each said second-stage chamber is by pressurizing said first-stage chamber above a pressure level of each said second-stage chamber.

4. Apparatus as recited in claim 1, wherein said conduit is connected for said particles flowing from said first-stage chamber to said second-stage chamber to be particles suspended in said first-stage chamber.

5. Apparatus as recited in claim 1, wherein there are more than one second-stage chambers.

6. Apparatus as recited in claim 1, wherein there are multiple said means for withdrawing suspended particles from each said second-stage chamber, into corresponding multiple collection areas.

7. Apparatus as recited in claim 1, wherein said means for withdrawing suspended particles from said second-stage chamber into a collection area comprises a three-way valve, having three connections, namely one to a withdrawal tube connected to said second-stage chamber, one to a supply of purging gas, and one to collection cell, said valve being operable so that in one position purging gas flows into said second-stage chamber, preventing particles from entering the withdrawal tube, whereas in another position purging gas flow is prevented and particles can flow through the withdrawal tube and into the collection cell, whereby a predetermined amount of particles can be dispensed by controlling the amount of time the valve is in said other position.

8. Apparatus as recited in claim 1, wherein said at least one second-stage chamber has a dilute-phase fluidized bed with a dilute gas-solids suspension filling the whole chamber.

9. Apparatus as recited in claim 8, wherein said first-stage chamber has a dense-phase fluidized bed with a freeboard above said bed.

10. Apparatus as recited in claim 8, wherein said first-stage chamber has a dilute-phase fluidized bed with a dilute gas-solids suspension filling the whole chamber.

11. Apparatus as recited in claim 1, wherein said means for withdrawing suspended particles from said second-stage chamber into at least one collection area comprises, for each said collection area, a withdrawal conduit connected between said second-stage chamber and said collection area, with a pressure drop from said at least one second-stage chamber to said collection area, and with a valve between each said withdrawal conduit and collection area, such that flow of particles from said second-stage chamber to said collection area is controlled by said valve.

12. Apparatus as recited in claim 11, wherein said valve is a time-controlled solenoid valve.

13. Apparatus as recited in claim 12, wherein said solenoid valve is a three-way valve with its three ports connected respectively to said withdrawal conduit, said collection area and a higher-pressure purging gas supply, such that purging gas may back-flow in said withdrawal conduit towards said second-stage chamber, thereby preventing suspended particles from entering the withdrawal tube until said three-way valve is operated to connect said withdrawal tube to said collection area instead of to said purging gas supply.

* * * * *

UNITED STATES PATENT AND TRADEMARK OFFICE

CERTIFICATE OF CORRECTION

PATENT NO. : 6,183,169 B1 
DATED : February 6, 2001
INVENTOR(S) : Zhu, Jingxu, Grace, John R. and Pourkavoos, Nazaneen It is certified that error appears in the above-identified patent and that said Letters Patent is hereby corrected as shown below:

Column 5,
Lines 3 to 5 should read:

-- one second-stage gas-solids fluidization chamber, said first-stage and said at least one second-stage chamber having particle fluidization --

Signed and Sealed this

First Day of October, 2002

Attest:

JAMES E. ROGAN

*Attesting Officer* *Director of the United States Patent and Trademark Office*